(12) United States Patent
Karas et al.

(10) Patent No.: US 7,292,979 B2
(45) Date of Patent: Nov. 6, 2007

(54) TIME ORDERED INDEXING OF AUDIO DATA

(75) Inventors: D. Matthew Karas, London (GB); William J. Muldrew, London (GB)

(73) Assignee: Autonomy Systems, Limited (GB)

( * ) Notice: Subject to any disclaimer, the term of this patent is extended or adjusted under 35 U.S.C. 154(b) by 1003 days.

(21) Appl. No.: 10/060,579

(22) Filed: Jan. 29, 2002

(65) Prior Publication Data

US 2003/0088397 A1 May 8, 2003

(30) Foreign Application Priority Data

Nov. 3, 2001 (GB) .................................. 0126438.1

(51) Int. Cl.
*G10L 15/06* (2006.01)
*G10L 15/08* (2006.01)
*G10L 17/00* (2006.01)

(52) U.S. Cl. ..................... 704/244; 704/243; 704/246

(58) Field of Classification Search ................ 704/235, 704/243, 244, 246
See application file for complete search history.

(56) References Cited

U.S. PATENT DOCUMENTS

| | | | |
|---|---|---|---|
| 5,774,593 A | | 6/1998 | Zick et al. |
| 5,802,361 A | | 9/1998 | Wang et al. |
| 6,073,095 A | * | 6/2000 | Dharanipragada et al. .. 704/242 |
| 6,085,160 A | * | 7/2000 | D'hoore et al. .......... 704/256.2 |
| 6,336,093 B2 | | 1/2002 | Fasciano |
| 6,442,519 B1 | * | 8/2002 | Kanevsky et al. .......... 704/243 |
| 6,505,153 B1 | * | 1/2003 | Van Thong et al. ........ 704/211 |
| 6,665,644 B1 | * | 12/2003 | Kanevsky et al. .......... 704/275 |
| 6,990,448 B2 | * | 1/2006 | Charlesworth et al. ..... 704/243 |
| 6,996,526 B2 | * | 2/2006 | Basson et al. ............. 704/231 |
| 7,117,231 B2 | * | 10/2006 | Fischer et al. ............. 707/203 |
| 2002/0135618 A1 | * | 9/2002 | Maes et al. ................. 345/767 |
| 2002/0163533 A1 | * | 11/2002 | Trovato et al. ............. 345/728 |
| 2002/0193991 A1 | * | 12/2002 | Bennett et al. ............. 704/247 |
| 2004/0080528 A1 | * | 4/2004 | Rand et al. ................. 345/738 |

FOREIGN PATENT DOCUMENTS

| | | |
|---|---|---|
| EP | 0 749 109 A2 | 12/1996 |
| EP | 0 810 794 A2 | 12/1997 |
| EP | 0 982 684 A1 | 3/1998 |

(Continued)

OTHER PUBLICATIONS

Bruce Lucas, VoiceXML for Web-based distributed conversational applications, 2000, Communications of the ACM, Volum 43, No. 9, pp. 53-57.*

(Continued)

*Primary Examiner*—Talivaldis Ivars Smits
*Assistant Examiner*—Thomas E. Shortledge
(74) *Attorney, Agent, or Firm*—Blakely, Sokoloff, Taylor & Zafman LLP (57) ABSTRACT

Methods and apparatuses in which attributes including one or more types of accents and one or more types of human languages from an audio information stream are identified. Each identified attribute from the audio information stream is encoded into a time ordered index. Each of the identified attributes shares a common time reference. Different human language models are compared at approximately the same time to generate an integrated time ordered index.

32 Claims, 4 Drawing Sheets

FOREIGN PATENT DOCUMENTS

| | | |
|---|---|---|
| EP | 0 982 947 A2 | 3/2000 |
| EP | 1 076 329 A2 | 2/2001 |
| GB | 1 255 834 | 12/1971 |
| GB | 2 351 592 A | 1/2001 |
| GB | 2381638 | 5/2003 |
| GB | 2381688 | 5/2003 |
| GB | 2388739 | 11/2003 |
| GB | 2388738 | 6/2004 |
| WO | WO98/47084 | 10/1998 |
| WO | WO 00/46787 | 8/2000 |
| WO | WO 01/65420 A2 | 9/2001 |
| WO | WO 01/95631 A2 | 12/2001 |
| WO | WO 01/095631 A3 | 12/2001 |

OTHER PUBLICATIONS

DREMEDIA, Cutting to the Heart of Digital TV, Core Audio Technology, Copyright 2001, 3 pages, http://www.dremedia.com/technology/audio.html, Sep. 2001.

Dremedia, Cutting to the Heart of Digital TV, Dremedia—Technology Cutting to the Heart of Digital TV, Copyright 2001, 3 pages, http://www.dremedia.com/technology/.

DREMEDIA, Cutting to the Heart of Digital TV, Core Video Technology, Copyright 2001, 2 pages, http://www.dremedia.com/technology/corevideo.html, Sep. 2001.

DREMEDIA, Cutting to the Heart of Digital TV, Dremedia iTVNow™ Fully automated interactive television production and delivery, Copyright 2001, 5 pages, http://www.dremedia.com/products/itvnow.html, Sep. 2001.

DREMEDIA, Cutting to the Heart of Digital TV, Dremedia TM production Suite™ Fully automated digital media productionand management, Copyright 2001, 6 pages,http://www.dremedia.com/products/tape/html, Sep. 2001.

VIRAGE, Media Analysis Plug-Ins for VideoLogger, Virage brochure, Copyright 2001, 2 pages, Oct. 2001.

VIRAGE, Media Analysis Software, Introducing Real-Time Analysis Software for Face and On-Screen Text Recognition, Copyright 2001, 2 pages, http://www.virage.com/products/media_analysis_software.html, Oct. 2001.

VIRAGE, VideoLogger, Copyright 2001, 2 pages, http:/www.virage.com/products/videologger.html, Oct. 2001.

VIRAGE, SmartEncode, The Virage SmartEncodeTM Process, Copyright 2001, 2 pages, http:/www.virage.com/products/smartencode.html, Oct. 2001.

FAST-TALK™ Accurate High-Speed Audio Searching—Without Text Conversion, Copyright 2001, 1 page, http:/www.fast-talk.com/.

FAST-TALK™ Technology, Copyright 2001, 3 pages, http:/www.fast-talk.com/technology.html.

Fast-Talk™ Technology, Other Methods of Searching Audio Content, Copyright 2001, 2 pages, http:/www.fast-talk.com/technology_other.html.

DREMEDIA, Cutting to the Heart of Digital TV, Dremedia's XML Architecture, Copyright 2001, 2 pages. http://www.dremedia.com/technology/xml.php.

DREMEDIA, Cutting to the Heart of Digital TV, Core Text Technology, Copyright 2001, 3 pages, http://www.dremedia.com/technology/coretext.php.

DREMEDIA, Cutting to the Heart of Digital TV, Core Video Technology, Copyright 2001, 3 pages, http://www.dremedia.com/technology/corevideo.php.

Mark Clements, Sc.D., Peter S. Cardillo, MSEE, Michael Miller, CTO, Phonetic Searching Of Digital Audio, 10 pages, copyright unknown, Fast-Talk Communications, inc. Atlanta, Georgia.

Mark Clements, Sc.D., Peter S. Cardillo, MSEE, Michael Miller, CTO, Phonetic Searching vs. LVCSR: How to Find What You Really Want in Audio Archives, 17 pages, copyright unknown, Fast-Talk communications, inc. Atlanta, Georgia.

Intelligent Access to Digital Video: The Informedia Project Wactlar, H., Stevens, S., Smith, M., Kanade, T., IEEE Computer, 29(5), Digital Library Initiative Special Issue., May 1996.

Integration of Continuous Speech Recognition and Information Retrieval for Mutually Optimal Performance, Siegler, M.A., PHDS thesis, Carnegie Mellon University, Electrical and Computer Engineering, Dec. 15, 1999.

Integrating and Using Large Databases of Text, Images, Video, and Audio Hauptmann, A., IEEE Intelligent Systems Magazine, 14(5), pp. 34-35, Sep./Oct. 1999.

\* cited by examiner

TIME ORDERED INDEXING OF AUDIO DATA

RELATED APPLICATIONS

This application is related to and claims benefit of the filing date of United Kingdom patent application Serial No. 0126438.1, titled Time Ordered Indexing Of Audio Data, Docket No. 005827.P002, filed Nov. 3, 2001, which has now issued as UK Patent GB2381638 and its divisional UK Patent GB2388738.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

This invention generally relates to extracting information from one or more streams of information. More particularly, an aspect of this invention relates to identifying audio characteristics.

BACKGROUND OF THE INVENTION

Volumes of material come into and are stored in archives by television, radio, and news production facilities today. In a previous technology, personnel manually generated software tags for the content in this material. The software tags contained descriptors about the audio/video data in order to assist searching through and finding a desired piece of information in the volumes of material. Journalists, interns or researchers listen to hours of tape manually searching and analyzing through the recorded information to find the exact segment or piece of knowledge that the person was seeking. Limited sets of audio content were tagged because the manual process of tagging is expensive. Additionally, the non-standardized methods for tag coding generate high error rates during the search process.

In a prior art technology, generating an accurate indexed transcript from an unknown speaker's conversation is very difficult. In general, if the transcript is to be accurate, then the speaker cannot be unknown to the system. The transcription software required training on a particular speaker's voice prior to creating an accurate transcript from that speaker dictation. The training process was time consuming.

Further, if a two-way conversation between unknown speakers is occurring and multiple human languages are being used, then the results from multiple human language models are typically separately indexed. Further, other characteristics of information stream such video images corresponding to the two-way conversation are separately indexed from the audio characteristics. All of these separate indexes are manually compared and manually indexed to correlate which spoken text is identified with corresponding speaker. Limited amounts of information are transcribed because of the time and expense involved.

SUMMARY OF THE INVENTION

Methods and apparatuses in which attributes including one or more types of accents and one or more types of human languages from an audio information stream are identified. Each identified attribute from the audio information stream is encoded into a time ordered index. Each of the identified attributes shares a common time reference. Different human language models are compared at approximately the same time to generate an integrated time ordered index.

BRIEF DESCRIPTION OF THE DRAWINGS

The drawings refer to the invention in which.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific attributes, named components, connections, computer languages and human languages, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

In general, various methods and apparatuses are described that may use audio analysis software to identify and index attributes of an audio information stream, such as live telephone conversation. Once the attributes from the information stream are identified, then the software engine may automate functions such as locating a specific audio segment by searching a database with the words that were spoken in that audio segment, research archives for similar information even while the original feed is still be recorded, identify the most relevant words in context to the subject matter being discussed, as well as multiple other uses that can be done once aspects of the information stream are broken down into attributes and then indexed.

Figure 1:
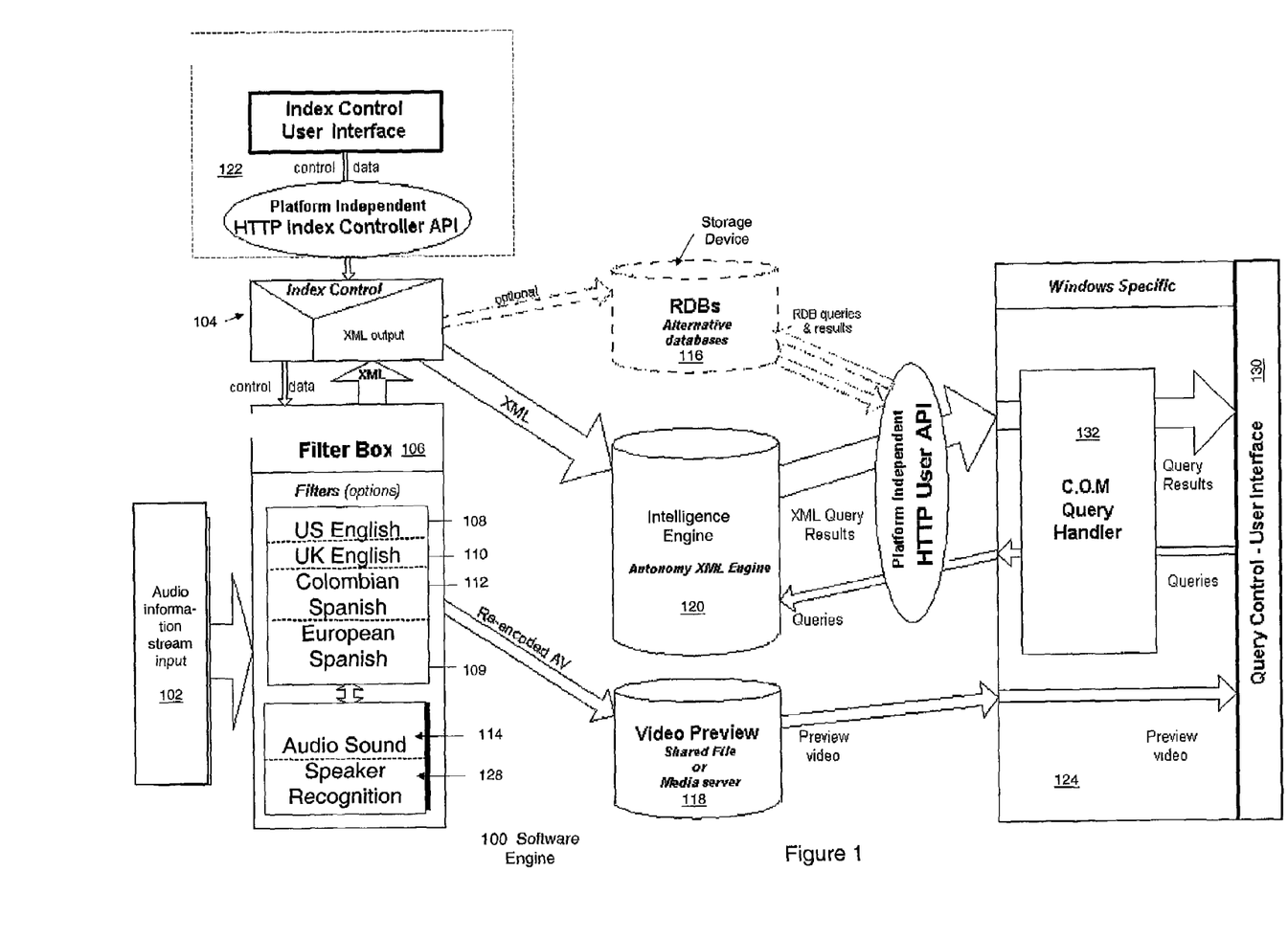
FIG. 1 illustrates an embodiment of a software engine that converts spoken words in an information stream to written text and generates a separate encoded file for every word in which each file shares a common time reference.

FIG. 1 illustrates an embodiment of a software engine that converts spoken words in an information stream to written text and generates a separate encoded file for every word in which each file shares a common time reference. In an embodiment, the software engine 100 may include one or more inputs 102 for information streams, an index control module 104, a filter box 106 containing one or more attribute filters 108, 109, 110, 112, 114, storage devices such as a rational data base 116 and an audio-visual media server 118, an intelligence engine 120, a triggering and synchronization module 122 including an index control user interface 134, and a manipulation module 124 including a query control user interface 130.

Overall, in an embodiment, one or more streams of audio information pass through one or more filter boxes 106. The filter boxes 106 send data corresponding to attributes of the information stream passing through that filter box 106 to the index control module 104. The index control module 104 indexes all of the data from the one or more filter boxes 106. The index control module 104 then may send the indexed data to a storage device 116 as well as the intelligence engine 120. The manipulation module 124 contains a graphic user interface to allow a user to manipulate the indexed data. The triggering and synchronization module 122 allows the user to program events to occur automatically based upon the indexed data passing through the index control module 104.

In an embodiment, the software engine 100 may have one or more information stream inputs 102 into a filter box 106. In an embodiment, at least one of the information stream inputs 102 includes audio-visual data. In an embodiment, each information stream that contains audio-visual data may be separated into discrete information streams such as a video information stream input and an audio information stream input. In an embodiment, each audio information stream may be separated into different channels of audio information. In an embodiment, information streams are not separated into different component parts prior to entering a filter box 106. Each information stream may be supplied to the attribute filters 108, 109, 110, 112, 114 within a filter box 106 in parallel or sequentially in series.

The filter box 106 contains various attribute filters 108, 110, 112, 114. For example, an embodiment may contain attribute filters including a various human language models including United States English 108, United Kingdom English 110, European Spanish 109, Colombian Spanish 112, and an audio sound attribute filter 114. In an embodiment, the one or more attribute filters 108, 109, 110, 112, 114 may identify attributes from each stream of information. The identified attributes may be a human language type, a change in human language type being spoken, a human accent, a change in human accent being spoken, speaker's individual voice characteristic, a change of speaker, discrete spoken words, individual written words, and other similar characteristics. In an embodiment, each attribute filter 108, 109, 110, 112, 114 may be separated into discrete modules to increase the focus, efficiency, and resolution capability of that individual module. In an embodiment, each attribute filter 108, 109, 110, 112, 114 detects for specific attributes from the information stream input data such as the human language type being spoken, speaker changes, each word spoken by a speaker, etc. Each attribute filter 108, 109, 110, 112, 114 then identifies that detected attribute. Once the attribute is identified by a given attribute filter 108, 109, 110, 112, 114, then the identified attribute is encoded into a computer language.

Figure 2:
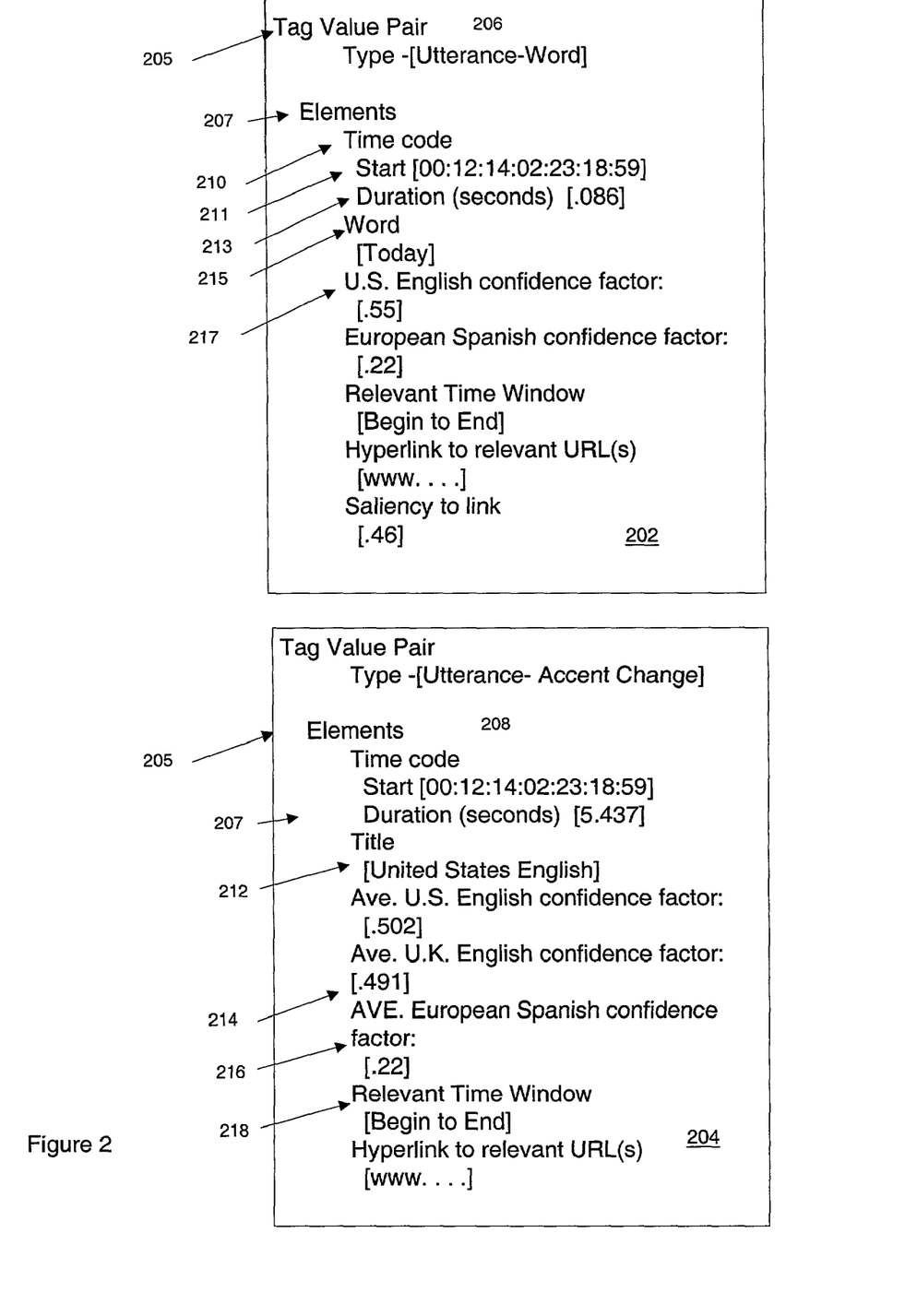
FIG. 2 illustrates exemplary identified attributes encoded into a computer language.

FIG. 2 illustrates exemplary identified attributes encoded into a computer language. In an embodiment, each attribute filter may use an embedded tag structure computer language such as external markup language (XML) to encode the identified attribute data. In an embodiment, the attribute filter may utilize another embedded tag structure computer language such as hypertext markup language (not shown) but for ease of understanding the concepts of the invention XML will be described.

Two exemplary XML documents 202, 204 produced by attribute filters will be described. An XML document has a hierarchical layered structure including tag-value pairs and elements of that tag value pair. In an embodiment, an XML tag value pair 205 defines the particular type of attribute, such as an Accent change 208, an identified word 206, a human language being spoken, etc. and elements 207 of the particular tag value pair 205 define characteristics of that attribute, such as a time code 210, etc. For example, a first tag-value pair 206 may contain the identified attribute of "Utterance-Word" which indicates the attribute filter detected an Utterance and identified the utterance as a word. Similarly, a second tag-value pair 208 may contain the identified attribute of "Utterance-Accent Change" which indicates that the attribute filter detected a change of accent in the spoken words and identified the time frame during which that accent was being used.

As noted, the elements 207 may describe characteristics, such as meta data, associated with a particular tag-value 205. For, example, the Utterance-Word tag value pair 206 may include elements such as the time code 210 including the start time 211 and duration or time frame 213 of the identified attribute, what the individual identified word 215 is such as "Correct" one or more confidence ratings as to the accuracy of the identified word 217, as well as any other information associated with that identified attribute. Similarly, the Utterance-Accent Change tag value pair 208 may include elements 207 such as the time code 212, the identified accent of the speaker 214, the relevant time window from the beginning of the accent being spoken to end of the accent being spoken 216, the average confidence rating in the identified accent during the relevant time window 215, hyperlinks to relevant URL's 218, as well as any other information associated with that identified attribute.

Referring to FIG. 1, in an embodiment, the information stream is processed by the one or more attribute filters 108, 109, 110, 112, 114 in each filter box in order to produce an XML document containing a rich variety of audio meta data and optionally visual meta data. The attribute filters 108, 109, 110, 112, 114 may be programmed to extract the content and meta-data from each segment of the monitored information stream 102. In an embodiment, the attribute filters 108, 109, 110, 112, 114 due to the nature of tag-structured languages inherently attach the XML tags based on the nature of the content extracted from information streams 102. The XML tags enable material to be identified and distributed and the software engine 100 to automatically capture, categorize, link or make material available via the appropriate system.

Each individual attribute filter 108, 109, 110, 112, 114 may generate its own XML document containing the identified attribute. Further, each individual XML document may be summed into an overall XML document containing a conglomeration of all the individual XML documents pertaining to the entirety of the identified attribute. For example, the overall XML document may capture a transcript of a spoken conversation; speaker segmentation and/or identification; human language identification; human accent and dialect identification; and any other auxiliary data available from legacy systems or source meta-data.

In an embodiment, the index control module 104 generates the time codes which each attribute filter 108, 109, 110, 112, 114 attaches as an element for each identified attribute.

Therefore, every identified attribute of an information stream may be referenced to the same time keeping mechanism, such as a clock or video frame counter. In an embodiment, the index control module 104 generates time codes for each identified attribute referenced to the time indication or the video frame count. In an embodiment, the index control module 104 uses a time ordered index via a data table that keeps track of the data by a time indication and may be correlated by the time indication. In an embodiment, an integrated time ordered index consists of some or all of the attributes identified by the attribute filters from the same information stream merged into a single index of identified attributes all sharing a common time reference.

In an embodiment, a first attribute from the information stream may be correlated or paired with other attributes having a similar time code. The similar time code may be a first attribute possessing the same start time code as a second attribute or due to the duration of the attributes overlapping with each other. For example, separate identified attributes of the same information stream, such as a video clip of a person speaking and the transcribed text of the person's speech, may be frame accurate because they are both referenced to the same synchronized time code. Thus, the sequence of time coded XML documents containing a video track from pan to fade or scene change to scene change may be synchronized with an audio track corresponding to the audio XML documents having the same sequence of time codes.

In an embodiment, the index control module 104 is an HTTP controlled server that coordinates information stream processing jobs. The index control module 104 distributes the processing load over a number of slave filter boxes 108, 109, 110, 112, 114. The index control module 104 monitors for processing requests and directs the processing requests onto the filter boxes 106. The index control module 104 manages the XML results that each filter box 106 streams back to the index control module 104. Any data coming from the filter box 106 can be sent by the index control module 104 to the intelligence engine 120 as unstructured data. The index control module 104 also processes the control commands that enable the management of processing jobs and inquiries into job statuses.

In an embodiment, the index control module 104 is controlled using HTTP commands processing requests. The HTTP commands can be issued via a HTTP proxy server in order to cross network boundaries even with a firewall in place. Once a processing job is complete, then the index control module 104 may perform one or both of the following two actions. The index control module 104 may index the attribute results into the intelligence engine 120. The index control module 104 may also save the results into a local directory where it can be accessed by external processes. Once the identified attribute is captured, then the information may be sent as an XML document to a database such as a rational database 116.

The filter box 106 may be a slave process to the index control module 104. Multiple filter boxes 106 can be installed on different physical machines. The index control module 104 can be configured to distribute processing requests to each of the filter boxes 106. The capability of having multiple processing machines can ensure real-time or better processing rates even when the processing load is very high.

The processing tasks performed by an individual filter box 106 are determined by the plug-in attribute filters 108, 109 110, 112, 114 that are configured to be used in that individual filter box. This modular architecture allows attribute filters to be added or removed as desired.

Each attribute filter 108, 109 110, 112, 114 may perform a different processing task on the information stream. Alternatively, a first attribute filter, such as an accent identification attribute filter, may accept as its input the output of second attribute filter, such as speech recognition attribute filter 128. In an embodiment, the output of each attribute filter 108, 109 110, 112, 114 may be merged into an integrated time ordered index because each identified attribute shares a common time reference measurement.

In an embodiment, the audio attribute filters use statistical methods to process the digital audio signal. The audio attribute filters may be based upon decomposing digitized speech into its phonetic constructs. The phonetic sequence is then analyzed in conjunction with acoustic model and statistical improbabilities to calculate which is the most probable sequence of words and utterances. The audio attribute filters employ recognition technologies that keyword spotting to small and large vocabulary continuous speech recognition and information retrieval from spoken documents—to enable applications in speech and audio processing, such as: speech recognition, speaker recognition, language recognition and speech enhancement. In an embodiment, the audio attribute filters use neural network technology and "Hidden Markov Models" (HMMs) to construct an acoustic model that is able to provide a fast, accurate and dynamic solution within variable and rapidly changing acoustic environments. The audio attribute filters recognize human speech and logs every spoken word against a common time reference such as a time clock indication or video frame. This generates an index enabling rapid access to the precise moment in time where each word is spoken.

Various attribute filters may be included and a few exemplary modules will be described. The audio sound attribute filter 114 monitors the audio information stream to detect and identify spoken words, common sounds, human language identification; human accent and dialect identification, and other similar audio sounds. In an embodiment, the audio sound attribute filter 114 may be a SoftSound process. In an embodiment, the audio sound attribute filter 114 employs a speech recognition module 128. The audio sound attribute filter 114 may also provide Transcription and Speaker Segmentation/Identification of spoken audio information. Before sending the audio data encoded in XML, the audio sound attribute filter 114 may perform any bit-rate conversion and re-sampling that may be required.

In an embodiment, the audio sound attribute filter 114 transcribes spoken audio using whatever human language it is configured to use. The audio information can also be streamed to multiple transcription processes running different human language models, which enables automatic human language selection without human intervention. In an embodiment, the audio sound attribute filter 114 uses multiple human language models such as United States English 108, United Kingdom English 110, European Spanish 109, Colombian Spanish 112, German, Russian, Mandarin Chinese or any other human language model. Multiple transcription processes configured to run in different languages can be run in parallel. The results of each language model are compared to determine which human language is being spoken.

In an embodiment, a human language accent and dialect attribute filter may be added into the audio sound attribute filter 114. Alternatively, the output data from a human language accent attribute filter may be the input into or combined with the audio sound attribute filter data. In an embodiment, the audio sound attribute filter 114 ensures the correct language model is used, and audio-visual information streams containing multiple languages, e.g. interleaved United States and United Kingdom dialects, is transcribed with the highest possible accuracy due to each word transcribed from each language model containing a confidence rating in the accuracy of the transcribed word. In an embodiment, the audio sound attribute filter 114 also extends the language model vocabulary as new words enter the common vocabulary, e.g. names of new politicians etc.

In an embodiment, the Speaker Segmentation/Identification attribute filter 128 analyses the audio information stream 102 and attempts to identify the speaker against its database of known people. Even if this proves to be unsuccessful i.e. if the speaker is unidentifiable, the time offsets at which the speaker changes are detected and identified. The speaker change attributes can be useful for navigation through the indexed data similar to the indexed thumbnails. In an embodiment, the manipulation-module 124 contains a GUI that enables the management of the speaker database, the entry of new speakers, as well other similar activities. In an embodiment, the manipulation-module 124 allows a user to jump immediately to indexed data corresponding to a specific speaker by simply clicking on that speaker icon.

In an embodiment, the audio attribute filters may use predictive technology to provide the benefits of a large vocabulary speech recognition system without the overhead of a vast search space when considering sample audio.

The audio attribute filters may have inter-speaker independence. Recognition of speakers requires no initial training on the part of audio sound attribute filter 114 based upon the attribute filters being able to detect and identify unique characteristics of a speaker. The audio attribute filters may identify the unique characteristics such as vocabulary accent, and human language to individual speakers.

In an embodiment, the monitoring of a multiple real-time audio broadcasts is possible using one or more audio sound attribute filters 114 to process incoming audio feeds in excess of twice real-time. In an embodiment, the software engine accesses a Redundant Array of Independent Disks (RAID) environment as well as an extended storage provider environments, to leverage disk optimization and caching features to the optimize performance.

In an embodiment, the filter box 106 may include video attribute filters. In an embodiment, the video attribute filters use signal processing techniques that segment the content of a digital image into its component parts, in order that they may be identified, understood, labeled and indexed. In an embodiment, the core video attribute filters are based around condensation tracking and temporal fusion. The video stream is broken down into frames that are analyzed and compared in order to identify objects within a complex image, to identify changes of shot, and in order to reconcile unsynchronized soundtracks. Thus, resynchronizing the video attribute data with other attribute data is made simple. For example, combining image analysis of speaking lips with speech recognition and frame accurate signal manipulation allows resynchronization to be achieved at the press of a button. In an embodiment, every spoken word is logged against a time frame measurement shared by the corresponding video data. This generates an index of the information stream.

The Scene Change attribute filter analyses the video stream and detects scene changes and shot changes. The Scene Change attribute filter can distinguish between fades, pans and cuts, and upon detecting one, outputs a thumbnail picture, the current time code, and other characteristics of that attribute. The time index thumbnail is sent to the index control module 104. The index control module 104 may send the XML documents to the media server 118. The manipulation module 124 contains a Graphic User Interface that can access this information, display these thumbnails, and permit the user to navigate through the audio-visual clips e.g. by clicking on the thumbnail.

The Image Association attribute filter 112 analyses the output of the Scene Change Filter and extracts the thumbnail image from its results. The Image Association attribute filter 112 may apply multiple algorithms to the thumbnail image to produce a characteristic image signature. The index control module 104 can take these image signatures and index them into the storage devices 116 and/or the intelligence engine 120. The intelligence engine 120 can later be queried for images containing similar image signatures.

In an embodiment, the video attribute filters use signal processing techniques that segment the content of a digital image into its component parts, in order that they may be identified, understood, labeled and indexed. In an embodiment, the core video attribute filters are based around condensation tracking and temporal fusion. The video stream is broken down into frames that are analyzed and compared in order to identify objects within a complex image, to identify changes of shot, and in order to reconcile unsynchronized soundtracks. Thus, resynchronizing the video attribute data with other attribute data is made simple. For example, combining image analysis of speaking lips with speech recognition and frame accurate signal manipulation allows resynchronization to be achieved at the press of a button. In an embodiment, every spoken word is logged against a time frame measurement shared by the corresponding video data. This generates an index of the information stream.

In an embodiment, extracting individual shots from unlogged video archives can be achieved at many times real time, allowing instant access to key features within archives. In an embodiment, when working in RAID and extended storage provider environments, the software engine leverages disk optimization and caching features to ensure the optimal performance. In an embodiment, the software engine may process the information within the information stream at real time.

In an embodiment, communication between the audio attribute filters, video attribute filters and other components within a larger networked system through use of HTTP over TCP/IP allows for a highly scalable distributed system.

In an embodiment, each filter box may contain attribute filters other than video and audio attribute filters such as a text attribute filter that detects and identifies text within an information stream.

The storage devices 116 may include a rational data base and an image server to store the data associated with the information streams including the XML documents, associated image signatures, the JPEGs as well as other data.

The intelligence engine 120 may perform information operations. The intelligence engine 120 may provide both storage and search facilities on the XML results including the associated image signatures.

The intelligence engine 120 may process large amounts of structured and unstructured text, including the textual output from audio sound attribute filters 114 such as speech recognition 128. In an embodiment, based on advanced pattern-matching technology that exploits high-performance Bayesian probabilistic techniques, the intelligence engine 120 forms a conceptual understanding of text in any format and automates key operations and processing tasks upon it. In an embodiment, the intelligence engine 120 is an Autonomy Dynamic Reasoning Engine available from Autonomy Corporation, Cambridge Business Park, Cowley Rd, Cambridge United Kingdom.

In an embodiment, the intelligence engine 120 is based on advanced pattern-matching technology that exploits high-performance probabilistic modeling techniques to accept a piece of content and decide which operation to automatically perform on that information. A piece of content refers to a sentence, paragraph or page of text, meta-data, record containing human readable information, or the derived contextual information of an audio or speech snippet. In an embodiment, the automated information operations may be concept matching, agent creation, agent retraining, agent matching, information categorization, information summarization, and other similar information operations.

In an embodiment, the manipulation-module 124 includes a query control user interface 130, a query handler 132, one or more display windows 133 and a User Application Program Interface 135. The manipulation-module 124 interacts with the storage devices and the intelligence engine to allow a user to navigate and utilize the indexed information stream data.

Figure 3:
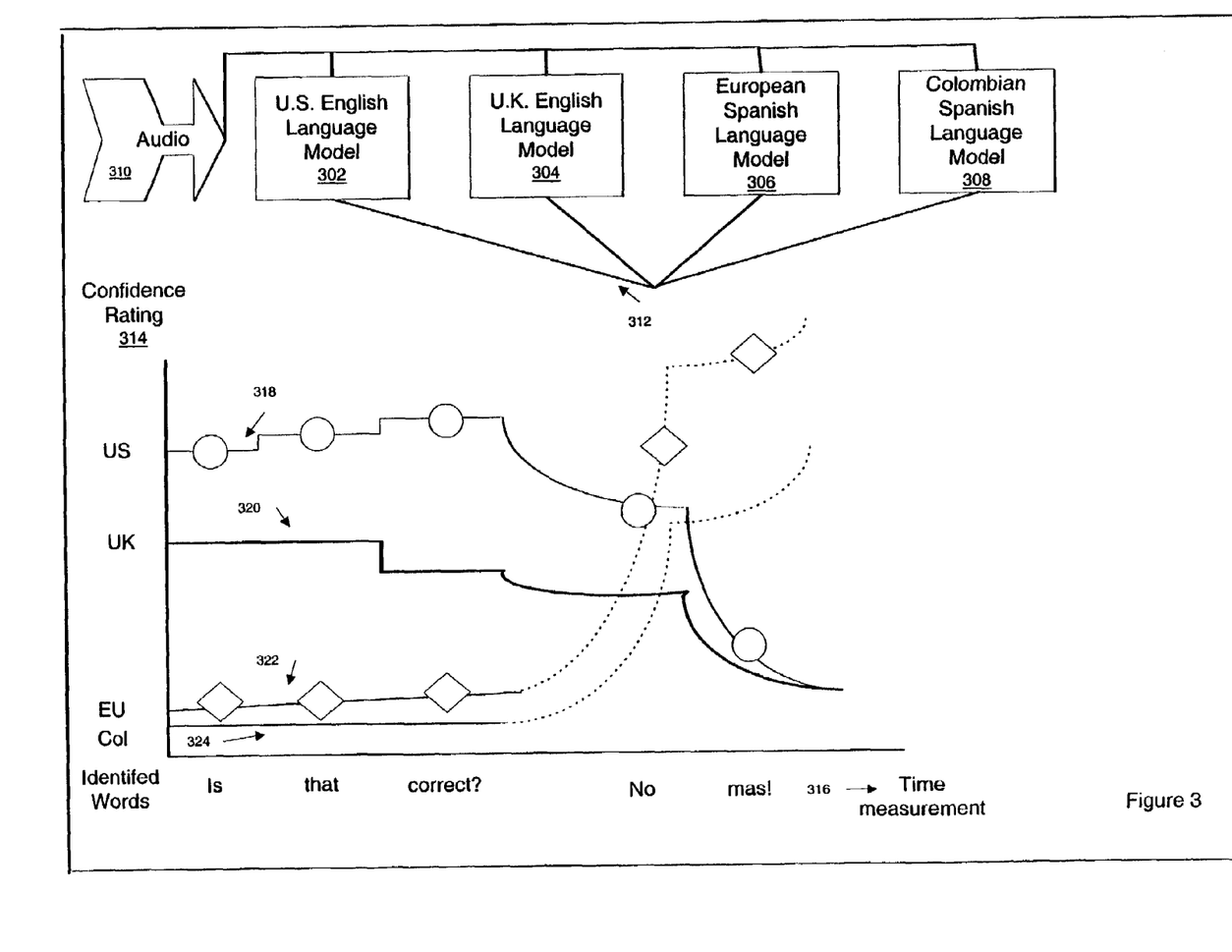
FIG. 3 illustrates an embodiment of an attribute filter comparing different human language models at approximately the same time to generate an integrated time ordered index.

FIG. 3 illustrates an embodiment of an attribute filter comparing different human language models at approximately the same time to generate an integrated time ordered index. In an embodiment, a human language and accent attribute filter consists of four language models 302, 304, 306, 308 receiving the same audio information stream 310 and comparing the output 312 from the different human language models 302, 304, 306, 308 at approximately the same time to generate an integrated time ordered index. The four exemplary human language models are a U.S. English language model 302, a U.K. English language model 304, European Spanish language model 306, and a Colombian Spanish language model 308. The human language models 302, 304, 306, 308 may be on the same machine or networked across multiple machines. The audio information stream 312 may be from an unstructured source such as phone conversation. The exemplary audio information stream 312 is phone conversation between two unknown speakers. The attribute filter is monitoring and transcribing the phone conversation. In U.S. English, a first speaker states the words, "Is that correct." In European Spanish, a second speaker responds with the words, "No mas!"

FIG. 3 also illustrates a graph of the confidence rating from each language model 318, 320, 322, 324 for each spoken word over time 316. In an embodiment, each language model 302, 304, 306, 308 generates a confidence factor 318, 320, 322, 324 in the accuracy of each spoken word. For the spoken word "Is" both the U.S. English language model 302 and the U.K. English language model 304 have high confidence factors 318, 320 in identifying the spoken word; however, because of the phonetic emphasis during the pronunciation of the word, "Is" the U.S. English language model 302 generates a higher confidence rating 318. In an embodiment, a comparison between similar language models may be used to determine the accent of the speaker. The European Spanish language model 306 and the Colombian Spanish language model 308 generate a very low confidence rating 322, 324 in the accuracy of identifying the word "Is" because that phonetic sound doesn't equate to an actual word in the Spanish language. The four language models 302, 304, 306, 308 continue detecting and identifying the spoken words "That" and "Correct?" and due to the individual speaker characteristics assign various confidence ratings to the identified words.

A speaker change occurs. A significant change in the value of the confidence rating of a particular language model can be detected. Further, the attribute filter may detect and log a crossover of confidence ratings between the confidence rating from a first language model that was higher and is now lower than a confidence rating from a second language model. The attribute filter may make use of all the captured data to determine if a speaker change occurs such as pauses, confidence rating crossovers, significant changes in the value of the confidence rating.

The second speaker states "No mas!" The four language models 302, 304, 306, 308 generate medium confidence ratings 318, 320, 322, 324 on the accuracy of the spoken word "No" because the word "No" has a meaning and therefore is recognized in all four language models 302, 304, 306, 308. However, the European Spanish language model 306 generates the highest confidence rating 322 due to the phonetic emphasis during the pronunciation of the word, "No." In an embodiment, a moving time frame window may be employed to capture the confidence factors of words spoken in the same sentence or context as the identified word in order to influence the confidence factor assigned to the identified word. When the Spanish spoken word "mas" is pronounced, then the confidence ratings of the English language models 318, 320 lower and the confidence rating of the European Spanish language model 322 due to the accent increases to again be the highest confidence rating. The captured data may be used to generate an accurate transcript of the conversation.

Further, the captured data may be used to identify the unique voice characteristics of the first speaker and second speaker. For example, the first speaker may possess the unique voice characteristics of speaking English with a U.S. accent as well as when the speaker annunciates "Correct?" the confidence rating of a U.S. English language model 318 and European Spanish language model 322 increase while the confidence rating of a UK English language model 320 lowers. In an embodiment, the one or more attribute filters generate a time ordered index of the audio information stream in real time. Thus, the triggering and synchronization module may generate an event, such as an alarm, when an attribute filter detects an attribute, such as an identification of unique voice characteristics of a particular speaker. In an embodiment, the triggering and synchronization module may triggering an event to occur upon an identification of unique voice characteristics of a speaker in less than five seconds.

For each word, the attribute filter generates an individual XML document including as elements the identified word, the confidence rating from each language model, and the time code for that word. The transcript of the entire conversation corresponds with an overall XML document for that conversation. However, because each word is a discreet XML document itself within the aggregate XML document, then a user may select a phrase or portion within the transcript and start playing the audio segment from that exact moment in time corresponding to the selected phrase.

In an embodiment, the audio information stream 310 passes through the attribute filter in a single pass rather then the audio information stream being sequentially analyzed first by a first language model and then by the next language model. In an embodiment, generating an integrated index including the data from the four language models in a single pass assists processing an audio information stream in real time. In an embodiment, an integrated time ordered index consists of some or all of the attributes identified by the attribute filters from the same information stream merged into single index of identified attributes all sharing a common time reference.

Referring to FIG. 1, in which the manipulation-module 124 interacts with the storage devices 116 and the intelligence engine 120 to allow a user to navigate and utilize the indexed information stream data. Due to the identified attributes being organized through a time ordered index, transmodal manipulations of each type of attribute may occur. A user through the user interface may perform operations on a first set of attributes in order to manipulate a second set of attributes. For example, a user may create a new audio clip of a desired segment of a radio broadcast by highlighting the transcribed text and cutting the transcript text from the text document. Further, the user may splice multiple video clips together by assembling and inserting text corresponding to each video clip. Thus, the user manipulates a first type of attribute such as the transcripted text in order to perform an operation on the second type of attribute such as spoken words or video characteristics.

In natural language and Boolean language queries, the intelligence engine 120 queries a natural language and/or Boolean language query from the manipulation-module 124 against any part of the XML documents stored in the storage, within the intelligence engine 120, and/or storage devices 116 external to the system such as the Internet. The intelligence engine 120 also can be queried to provide suggestions of similar content. Thus, for example, a user may remember three key words about a video segment of information that the user is trying to locate. The user may submit the query through the query control user interface 130 and view the resulting video segments that match the query results on in the display window 133.

In concept matching, the intelligence engine 120 accepts a piece of content or reference (identifier) as an input and returns references to conceptually related items ranked by relevance, or contextual distance. This may be used to generate automatic hyperlinks between pieces of content. Thus, while a live feed is being broadcast, the triggering and synchronization module may display hyperlinks to related documents to the topic which the speaker is talking about based upon concept matching to the indexed transcript correlating to the video segment.

In agent creation, the intelligence engine 120 accepts a piece of content and returns an encoded representation of the concepts, including each concept's specific underlying patterns of terms and associated probabilistic ratings. In agent retraining, the intelligence engine 120 accepts an agent and a piece of content and adapts the agent using the content. In agent matching, the intelligence engine 120 accepts an agent and returns similar agents ranked by conceptual similarity. This may be used to discover users with similar interests, or find experts in a field. This may also be used to identify a particular speaker even though software engine 100 has no previous knowledge of that speaker.

In agent alerting, the intelligence engine 120 accepts a piece of content and returns similar agents ranked by conceptual similarity. This may be used to discover users who are interested in the content, or find experts in a field.

In information categorization, the intelligence engine 120 accepts a piece of content and returns categories ranked by conceptual similarity. This may be used to discover which categories the content is most appropriate for, allowing subsequent tagging, routing or filing.

In information summarization, the intelligence engine 120 accepts a piece of content and returns a summary of the information containing the most salient concepts of the content. In addition, summaries can be generated that relate to the context of the original inquiry—allowing the most applicable dynamic summary to be provided in the results of a given inquiry.

In clustering, the intelligence engine 120, can organize large volumes of content or large numbers of profiles into self-consistent clusters. Clustering is an automatic agglomerative technique that partitions a corpus by grouping together information containing similar concepts.

In active matching, the intelligence engine 120 can accept textual information describing the current user task and returns a list of documents ordered by contextual relevance to the active task.

In retrieval, the intelligence engine 120 accepts natural language queries and returns a list of documents containing the concepts looked for, ordered by contextual relevance to the query. The intelligence engine 120 may also support Boolean queries.

The triggering and synchronization module 122 to automatically trigger links and synchronizes the appearance of the links in real time. The index control user interface 134 may issue processing jobs requests and monitor their progress. At the highest level there is the Indexing GUI, which is suited to once off processing requests, since it requires the manual entry of various processing parameters. At a lower level there may be scriptable command line utilities that enable the more technical user to run batch-processing jobs. At a lower level still, there may be the HTTP APIs, C APIs, C++ APIs and COM APIs that enable the applications programmer to control the processing back-end directly and programmatically.

As noted above, the triggering and synchronization module 122 may query the intelligence layer in order to approximately concurrently generate a link to related information from live source data. Live broadcast typically have a five second delay between being recorded to being broadcast. Further, the triggering and synchronization module 122 may establish a trigger for the intelligence engine 120 to send a link synchronized to appear at approximately upon the utterance of the most relevant word related to the link. Thus, the user may program through the triggering and synchronization module 122 to analyze the transcript of what is being said sentence by sentence, paragraph by paragraph, etc., and have the intelligence layer determine the most relevant word to the topic conveyed in that sentence/paragraph. Upon the utterance of that most relevant word, the triggering and synchronization module 122 displays the relevant link.

In an embodiment, the determining and synchronizing the appearance of a relevant link can be performed fast enough to be broadcast along side a live broadcast and depends on processor power, the complexity of the information stream, and the complexity of the batch processing job. Some lag can exist between the filter box receiving the information stream from a live broadcast and the time when the software engine 100 has determined a relevant link to the content and then the exact frame location to insert that link. In an embodiment, the lag can be less than 2 seconds in a simple scenario such as triggering some specified event on the utterance of a particular word. In an more complex scenario the lag may be up to 30 seconds to perform a quite detailed analysis of what the speaker is talking about and make sure that enough live speech is captured before requesting relevant links to the content of the live broadcast.

In an embodiment, the triggering and synchronization module 122 may trigger on an event. The event may be virtually anything that can be correlated to an attribute. For example, the triggering and synchronization module 122 may display a name title on screen when a particular person's voice is detected and remove the name title when the voice stops.

Figure 4:
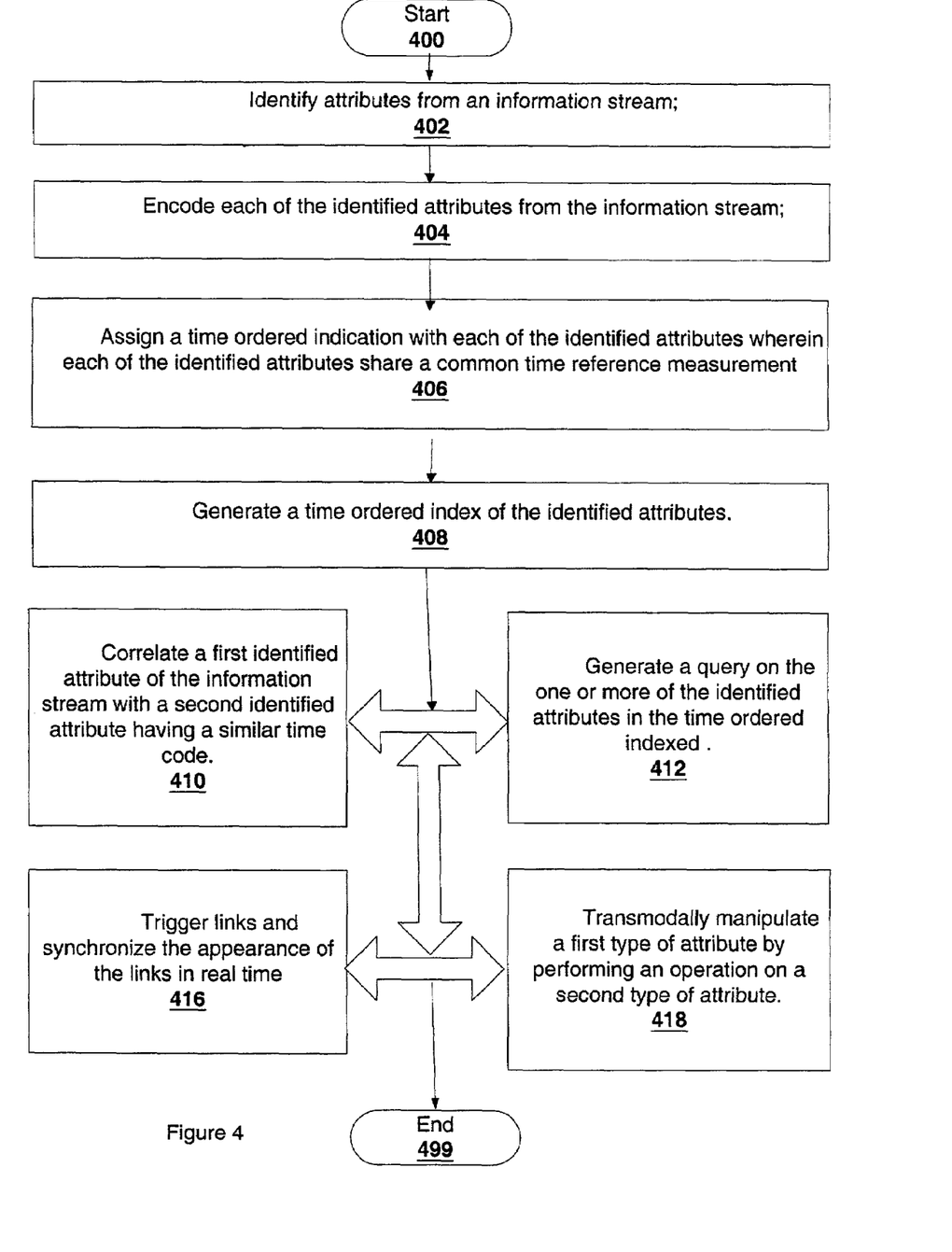
FIG. 4 illustrates a flow diagram of an embodiment of the software engine processing an information stream.

FIG. 4 illustrates a flow diagram of an embodiment of the software engine processing an information stream. In an embodiment, the software engine performs the functions as described above.

In block 402, attribute filters detect and identify attributes from an information stream. In an embodiment, the identified attributes of the information stream may be one or more types human languages being spoken, one or more types of accents being spoken, unique characters of a speakers voice, each spoken word as well as many other similar attributes.

In block 404, attribute filters encode each of the identified attributes from the information stream. In an embodiment, each attribute in encoded via extensible markup language.

In block 406, attribute filters assign a time ordered indication with each of the identified attributes. The encoded document includes the type of identified attribute, the content of the identified attribute, the characteristics of the identified attribute including a time reference indicating the start time of the attribute and the time frame in which the identified attribute was conveyed. In an embodiment, the index control module supplies the time ordered indication to each attribute filter to establish a common time reference such as a video frame count or time clock indication.

In block 408, the index control module generates a time ordered index of the identified attributes. In an embodiment, the index control module compares different human language models at approximately the same time to generate an integrated time ordered index. In an embodiment, the index control module generates a transcript of each spoken word and each spoken word shares a common time reference.

In block 410, the intelligence engine uses the time ordered index to correlate a first identified attribute of the information stream with a second identified attribute having a similar time code.

In block 412, the manipulation-module 124 generates a query on the one or more of the time ordered indexed identified attributes based upon some query input supplied by the user.

In block 414, the trigger and synchronization module links and synchronize the appearance of the links in real time.

In block 416, the manipulation-module 124 facilitates transmodal manipulations a first type of attribute by performing an operation on a second type of attribute.

In an embodiment, the software engine may be employed in Interactive TV. The software engine derives an understanding of the actual audio, visual, and textual content being broadcast on the Interactive TV. The software engine then cross references relevant link to the subject matter being broadcast in real time.

In one embodiment, the software used to facilitate the software engine can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other form of propagated signals (e.g., carrier waves, infrared signals, digital signals, EPROMs, EEPROMs, FLASH, magnetic or optical cards, or any type of media suitable for storing electronic instructions. Slower mediums could be cached to a faster, more practical, medium.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices. In an embodiment, the software engine may be employed in Interactive TV. The software engine derives an understanding of the actual audio, visual, and textual content being broadcast on the Interactive TV. The software engine then cross references relevant link to the subject matter being broadcast in real time.

While some specific embodiments of the invention have been shown the invention is not to be limited to these embodiments. For example, most functions performed by electronic hardware components may be duplicated by software emulation and vice versa. Thus, an integrated chip may be configured to accomplish the same functions as the system engine. In an embodiment, the information stream may be a web broadcast, a satellite broadcast, a television signal, or a similar information signal. In an embodiment, multiple video information streams as wells as multiple audio information streams may be supplied to each attribute filter. In an embodiment, each attributer filter may be replicated. For example, the software engine may have two speech recognition and analysis modules in which each speech recognition and analysis module monitors a separate audio channel information stream. The invention is to be understood as not limited by the specific embodiments described herein, but only by scope of the appended claims.

What is claimed is:

1. A method, comprising:

identifying attributes including one or more types of accents and one or more types of human languages from a multi-party audio information stream;

encoding each identified attribute from the audio information stream into a time ordered index, each of the identified attributes sharing a common time reference;

comparing results from different human language models at approximately the same time to generate an integrated time ordered index of the identified attributes; and triggering an event to occur upon an identification of unique voice characteristics of a speaker in less than five seconds.

2. The method of claim 1, further comprising:

comparing confidence ratings of the different human language models.

3. The method of claim 1, further comprising:

generating a transcript including each spoken word, wherein each spoken word shares the common time reference.

4. A machine-readable storage medium that stores instructions, which when executed by a machine, cause the machine to perform operations comprising:

identifying attributes including one or more types of accents and one or more types of human languages from a multi-party audio information stream;

encoding each identified attribute from the audio information stream into a time ordered index, each of the identified attributes sharing a common time reference;

comparing results from different human language models at approximately the same time to generate an integrated time ordered index of the identified attributes; and correlating a first identified attribute of the information stream with a second identified attribute having a similar time code, wherein the similar time code comprises the first identified attribute possessing a start time approximately the same as the second identified attribute or an overlapping of the durations associated with the first identified and the second identified attribute.

5. The article of manufacture of claim 4, further comprising instructions which cause the machine to perform further operations comprising:

generating a query on one or more of the identified attributes in the time ordered indexed.

6. The article of manufacture of claim 5, further comprising instructions which cause the machine to perform further operations comprising:

correlating a first identified attribute of the information stream with a second identified attribute having a similar time code.

7. The article of manufacture of claim 4, wherein the audio information stream comes from an unstructured information source.

8. The article of manufacture of claim 4, wherein the audio information stream includes audio-visual data.

9. The article of manufacture of claim 4, wherein the audio information stream includes speech data.

10. The article of manufacture of claim 4, wherein at least one of the identified attributes further comprises a change of accent.

11. The article of manufacture of claim 4, wherein at least one of the identified attributes further comprises a change of human language.

12. The article of manufacture of claim 4, wherein at least one of the identified attributes further comprises a discrete spoken word.

13. The article of manufacture of claim 4, wherein the identified attributes are encoded via extensible markup language.

14. The article of manufacture of claim 4, wherein the time ordered index includes a start time and a duration in which each identified attribute was conveyed.

15. The article of manufacture of claim 4, wherein the common time reference comprises a time indication.

16. The article of manufacture of claim 4, wherein the common time reference comprises a frame count.

17. The article of manufacture of claim 4, wherein the integrated time ordered index includes data from the different human language models.

18. An apparatus, comprising:

means for identifying attributes including one or more types of accents and one or more types of human languages from a multi-party audio information stream;

means for encoding each identified attribute from the audio information stream into a time ordered index, each of the identified attributes sharing a common time reference;

means for comparing results from different human language models at approximately the same time to generate an integrated time ordered index of the identified attributes; and means for correlating a first identified attribute of the information stream with a second identified attribute having a similar time code, wherein the similar time code comprises the first identified attribute possessing a start time approximately the same as the second identified attribute or an overlapping of the durations associated with the first identified and the second identified attribute.

19. The apparatus of claim 18, further comprising:

means for generating a query on the one or more identified attributes in the time ordered indexed.

20. A machine-readable storage medium that stores instructions, which when executed by a machine, cause the machine to perform operations comprising:

converting spoken words in an information stream to written text, the information stream containing audio information;

generating a separate encoded file for every word, wherein each encoded file shares a common time; and generating a link to relevant material based upon the spoken words and synchronizing a display of the link in less than five seconds from analyzing the information stream.

21. An apparatus comprising:

a software engine having one or more attribute filters to detect attributes from a multi-party audio information stream, identify the attributes, and assign a time ordered indication with each of the identified attributes, the software engine having an index control module to facilitate an integrated time order indexing of the identified attributes a computer readable storage medium to store the software engine; and a manipulation module to perform operations on a first set of attributes in order to manipulate a second set of attributes.

22. The apparatus of claim 21, wherein the time ordered indication comprises a start time and a duration in which the attribute was conveyed.

23. The apparatus of claim 21, wherein the one or more attribute filters generate a time ordered index of the audio information stream in real time.

24. The apparatus of claim 21, wherein the audio information stream passes through the one or more attribute filters a single time.

25. The apparatus of claim 21, wherein the first set of attributes compromises a section of transcribed text and the second set of attributes comprises video images having approximately the same time ordered indications as the transcribed text.

26. The apparatus of claim 21, further comprising:
a triggering and synchronization module to dynamically trigger a link and synchronize the appearance of the link based upon a transcribed text from the information stream.

27. An apparatus comprising:
a software engine having one or more attribute filters to detect attributes from a multi-party audio information stream, identify the attributes, and assign a time ordered indication with each of the identified attributes, the software engine having an index control module to facilitate an integrated time order indexing of the identified attributes
a computer readable storage medium to store the software engine; and
a triggering and synchronization module to dynamically trigger a link and synchronize the appearance of the link based upon a transcribed text from the information stream.

28. The apparatus of claim 27, wherein the time ordered indication comprises a start time and a duration in which the attribute was conveyed.

29. The apparatus of claim 27, wherein the one or more attribute filters generate a time ordered index of the audio information stream in real time.

30. The apparatus of claim 27, wherein the audio information stream passes through the one or more attribute filters a single time.

31. The apparatus of claim 27, further comprising:
a manipulation module to perform operations on a first set of attributes in order to manipulate a second set of attributes.

32. The apparatus of claim 31, wherein the first set of attributes compromises a section of transcribed text and the second set of attributes comprises video images having approximately the same time ordered indications as the transcribed text.

* * * * *